US006721056B1

United States Patent
Nakauchi et al.

(10) Patent No.: US 6,721,056 B1
(45) Date of Patent: Apr. 13, 2004

(54) SURFACE SHAPE MEASURING APPARATUS AND METHOD

(75) Inventors: Akihiro Nakauchi, Utsunomiya (JP); Chidane Ouchi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/638,885

(22) Filed: Aug. 16, 2000

(30) Foreign Application Priority Data

Aug. 20, 1999 (JP) .......................................... 11-233922

(51) Int. Cl.[7] .............................................. G01B 9/02
(52) U.S. Cl. ...................................... 356/489; 356/495
(58) Field of Search ................................ 356/489, 495, 356/511, 512, 513, 514, 515

(56) References Cited

U.S. PATENT DOCUMENTS 6,008,901 A * 12/1999 Ohtsuka ...................... 356/489

FOREIGN PATENT DOCUMENTS

JP          51-42495          12/1976

* cited by examiner

Primary Examiner—Frank G. Font
Assistant Examiner—Patrick Connolly
(74) Attorney, Agent, or Firm—Fitzpatrick, Cella, Harper & Scinto

(57) ABSTRACT

An apparatus for measuring the surface shape of the surface to be measured of an optical system to be measured includes a rotary stage holding the optical system to be measured thereon and rotatable about the optical axis of the optical system to be measured, a device for detecting the rotation azimuth of the rotary stage, an irradiating optical system for sequentially applying a coherent light beam to the plurality of measuring diameter positions of the surface to be measured of the optical system to be measured held on the rotary stage, a light receiving element for detecting the reflected light of the coherent light beam from the surface to be measured as an interference signal, and a calculating system for effecting the measurement of the surface shape of the surface to be measured on the basis of the result of the detection of the interference signal at each of the plurality of measuring diameter positions of the surface to be measured and the result of the detection by the rotation azimuth detecting device.

32 Claims, 3 Drawing Sheets

SURFACE SHAPE MEASURING APPARATUS AND METHOD

BACKGROUND OF THE INVENTION

1. Field of the Invention

This invention relates to a surface shape measuring apparatus and method, and particularly to a surface shape measuring apparatus and method suitable for measuring the asymmetrical component of the surface shape of each surface of an optical system comprised of a single lens or a plurality of optical elements while the optical system remains incorporated in ironware.

2. Related Background Art

Recently, high-performance optical systems have come to be required in various optical systems. In a high-performance optical system, it is necessary to approximate residual aberration to zero to the utmost, and from the viewpoints of both of design and manufacture, it is necessary to make wavefront aberration remaining in the optical system small.

To make the wavefront aberration of the high-performance optical system have a good level, it is necessary to reduce the manufacturing errors of the surface accuracy, homogeneity, etc. of a single lens which is a constituent in the manufacture, and more approximate individual optical elements to design values. For this purpose, various measuring methods and working methods have heretofore been proposed and carried out.

However, even in a state in which the individual optical elements are approximate to the design values, there is a case where the high-performance optical system does not achieve desired performance in its assembled state, i.e., a state in which each lens element is in ironware.

It is conceivable that the desired performance cannot be achieved due to a lens holding method or lens strain by dust, injury or the like. When the strain is created in the inner part of the assembled optical system, it has been difficult to measure the amount of surface strain by a simple method.

SUMMARY OF THE INVENTION

The surface shape measuring apparatus and method of the present invention have been made in view of the situation in which the performance of an optical system could heretofore be evaluated only in a state in which an optical system to be measured was entirely assembled and the internal states of individual constituents could not be measured. Moreover, heretofore, the evaluation of the optical system to be measured could be done only by a wavefront transmitted through the entire optical system to be measured, and the internal states of the individual constituents could not be known.

The present invention has as an object thereof to measure the internal state of an optical system to be measured in its assembled state.

Other objects of the present invention will become apparent from the following description of some embodiments of the invention.

DESCRIPTION OF THE PREFERRED EMBODIMENTS

Figure 1:
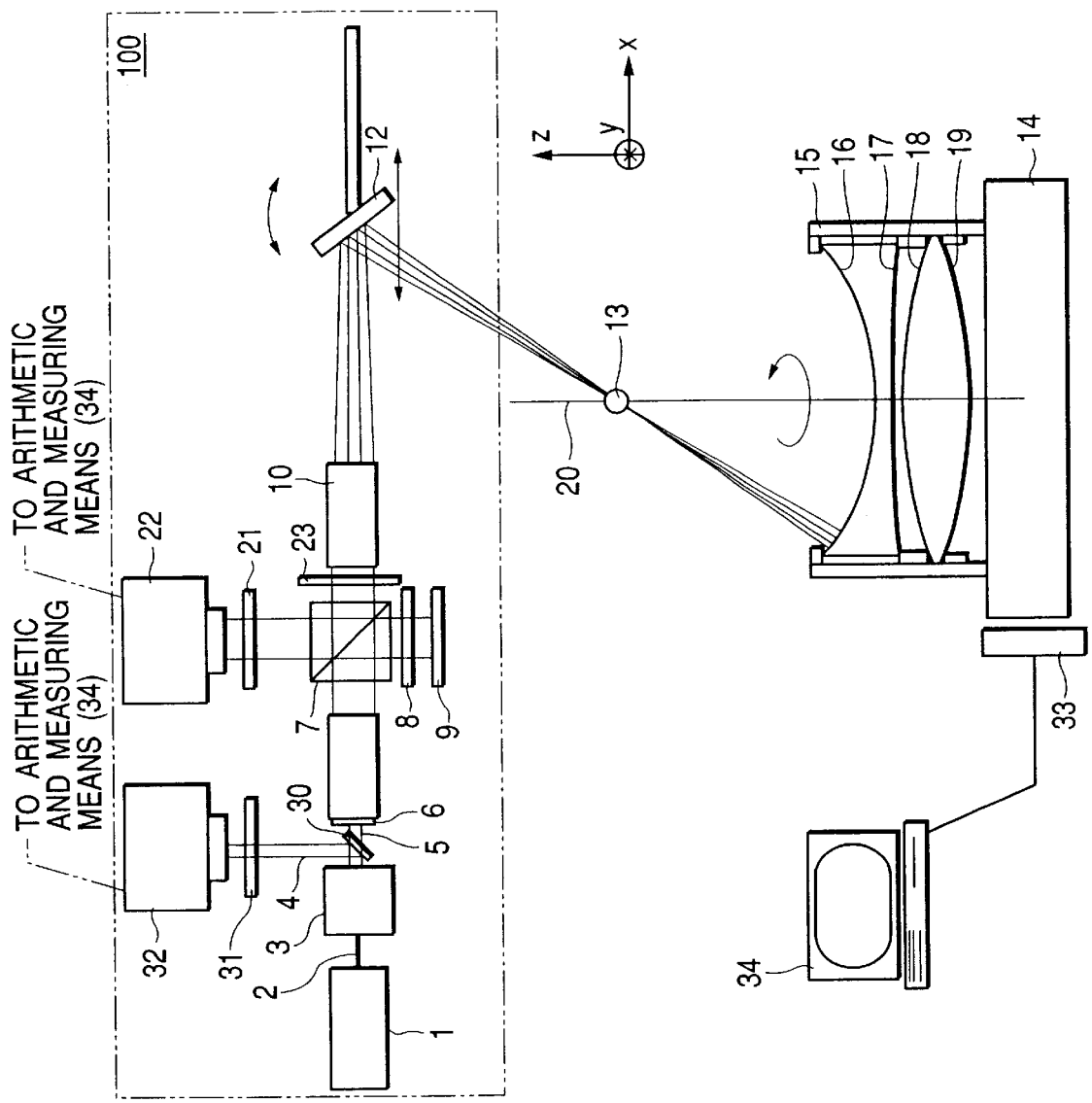
FIG. 1 shows a measuring state of Embodiment 1 of the surface shape measuring apparatus of the present invention.

FIG. 1 shows the construction of Embodiment 1 of the present invention, and more particularly, shows a disposition for effecting the measurement of the uppermost surface of an optical system 15 to be measured. The xyz coordinates are plotted so that as shown, the y-axis may be perpendicular to the plane of the drawing sheet of FIG. 1.

A laser beam 2 emitted from a laser source 1 becomes two-frequency lights 4 and 5 which are two coherent light beams of which the polarization azimuths are orthogonal to each other, by a frequency shifter 3. In FIG. 1, the polarization direction of the light beam 4 is parallel to the z-axis, and the polarization direction of the light beam 5 is parallel to the y-axis. Part of the two-frequency lights is taken out as a reference signal by a beam splitter 30 and interferes in a polarizing plate 31, and is detected by a first light receiving element 32 and is sent to arithmetic and measuring means 34.

On the other hand, the light transmitted through the beam splitter 30 becomes a plane wave of a large diameter by a beam expander 6, and the light beam 4 is transmitted through a polarizing beam splitter 7 and the light beam 5 is reflected by the polarizing beam splitter 7. The light beam 5 reflected by the action of the polarizing beam splitter 7 and having a polarization direction in the y-direction becomes a circularly polarized light by a quarter wavelength plate 8, is reflected by a mirror 9, is transmitted again through the quarter wavelength plate 8 and assumes a polarized state parallel to the x-direction. The light beam 5 which has assumed the polarized state parallel to the x-direction is transmitted through the polarizing beam splitter 7 and travels toward a polarizing plate 21.

Also, the light beam 4 transmitted through the polarizing beam splitter 7 is converted into a circularly polarized light by a quarter wavelength plate 23, and has its wavefront adjusted by a zoom lens 10 so as to be condensed at the apparent central position 13 of the curvature of a surface 16 to be measured, whereafter it travels toward a deflecting mirror 12. The deflecting mirror 12 deflects the light beam 4 so as to pass through the center of the curvature of the surface 16 to be measured of the optical system 15, and enter the predetermined diameter of the surface 16 perpendicularly thereto.

The arithmetic and measuring means 34 effects the control of moving the angle and position of the deflecting mirror 12 on the basis of the design data of the optical system 15 so that the light beam 4 may pass through the center 13 of the curvature of the surface 16 and enter the predetermined diameter of the surface 16 perpendicularly thereto. Accordingly, the deflecting mirror 12 is adapted to be rotatable about the y-axis and movable in the direction of the x-axis.

The light beam 4 has its wavefront adjusted by the zoom lens 10 so as to be condensed at the center 13 of the curvature of the surface 16. Consequently, the light beam 4 enters and is reflected by the surface 16 with a wavefront coincident with the curvature of the surface 16, and returns along the same path and is again transmitted through the zoom lens 10.

The light beam 4 again transmitted through the zoom lens 10 is converted into a plane wave, and by a quarter wavelength plate 23, it becomes a linearly polarized light of which the polarization azimuth is parallel to the y-axis rotated by 90° as compared with its initial state. Since its polarization azimuth has been rotated by 90°, the light beam 4 is reflected by the polarizing beam splitter 7 and is again coupled to the light beam 5, and travels toward the polarizing plate 21.

The two-frequency lights 4 and 5 pass through the polarizing plate 21 and have their polarization directions made even, whereafter they interfere with each other and are detected by a second light receiving element 22. The detection signal has the information of the surface 16 to be measured and is therefore sent as a measurement signal to the arithmetic and measuring means 34 such as a computer.

The reference signal and the measurement signal become sine waves of a frequency equal to the frequency difference between the two-frequency lights by the principle of the measurement of an optical heterodyne signal. The phase difference between the signals by the two light beams 4 and 5 is proportional to the difference in the length of the optical path and therefore, if the phase difference is measured by the use of a phase meter or the like, the difference in the length of the optical path can be simply measured.

After the optical system is set to the above-described state, the light beam is made to enter the position of the predetermined measurement diameter of the surface 16 to be measured, and the optical system 15 to be measured is rotated about the optical axis thereof by a rotary stage 14 of high accuracy. The optical system 15 to be measured is adjusted in advance so that the optical axis of the optical system 15 to be measured and the rotation axis of the rotary stage 14 may coincide with each other. The rotation azimuth of the rotary stage 14 is detected by rotation azimuth detecting means 33 and is sent to the arithmetic and measuring means 34.

If the surface 16 to be measured is of a rotation-symmetrical shape with respect to the rotation axis, the difference in the length of optical path between the two light beams 4 and 5 does not change, but if the surface 16 to be measured has a rotation-asymmetrical surface shape component, the difference in the length of optical path between the two light beams changes with the rotation of the optical system 15 to be measured. The arithmetic and measuring means 34 obtains the fluctuation of the difference in the length of optical path between the two light beams 4 and 5 resulting from the rotation azimuth of the rotary stage 14, and effects the calculation of the shape data of the surface 16 to be measured in the measured diameter.

When the measurement in a measured diameter is terminated, the deflecting mirror 12 is rotated and moved and adjusted, and the position of incidence of the light beam 4 onto the surface 16 to be measured is changed and the data of the difference in the length of optical path is measured in a new measured diameter. This operation is sequentially performed and the data of the difference in the length of optical path of the full circumference of the lens is obtained while the measured diameter is changed, and the calculation of the shape data of each measured diameter is effected by the arithmetic and measuring means 34. If the shape data for the plurality of diameters of the surface 16 to be measured thus obtained are connected together, the rotation-asymmetrical component of the surface shape of the whole of the surface 16 to be measured can be obtained.

Figure 2:
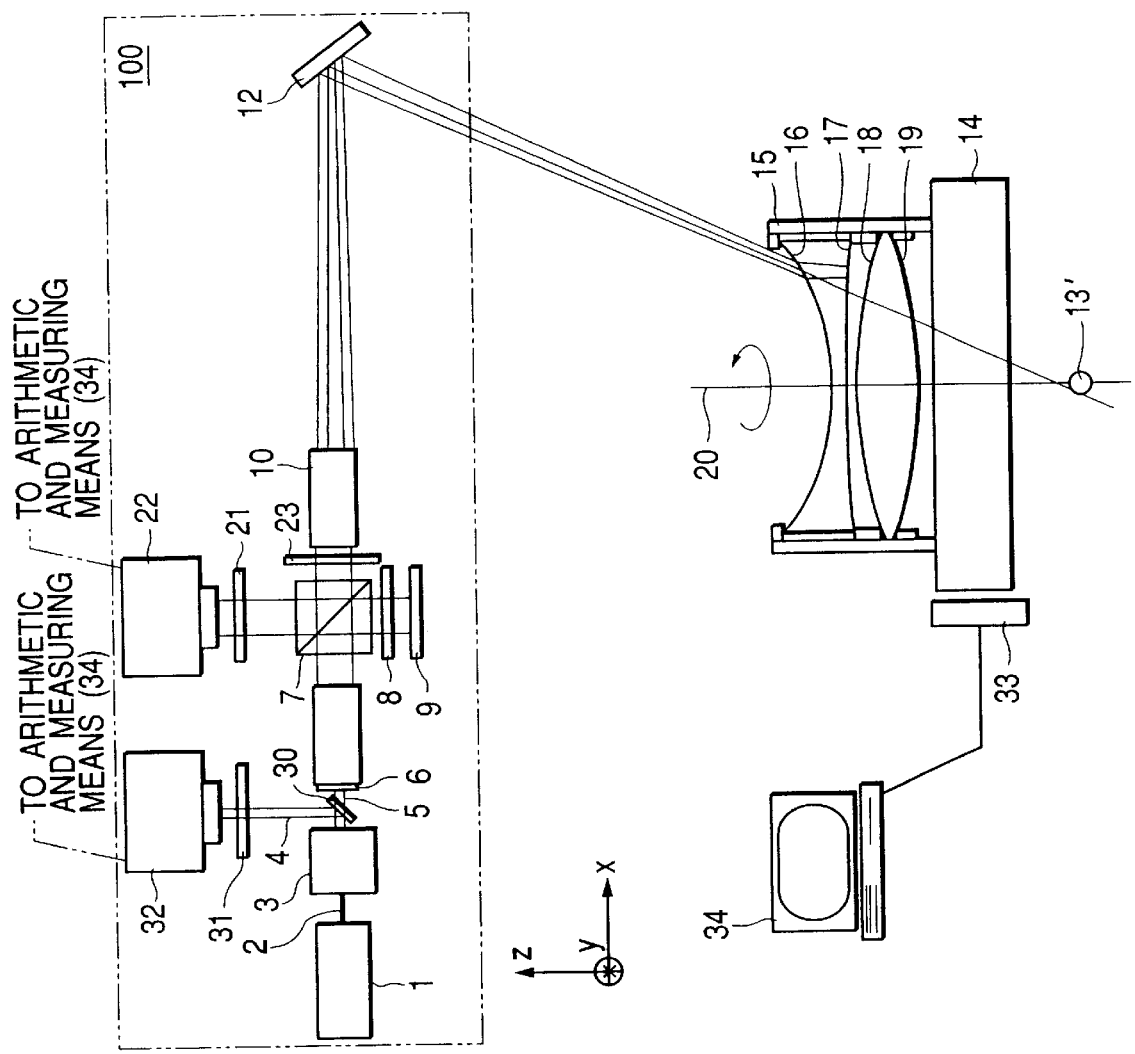
FIG. 2 shows another measuring state of Embodiment 1.

FIG. 2 shows a disposition for effecting the measurement of the second surface (second surface) 17 from the top of the optical system 15 to be measured. The zoom lens 10 and the deflecting mirror 12 are adjusted and the light beam 4 is directed so as to pass through the measuring diameter of the surface 17 to be measured and be condensed at the apparent central position 13' of curvature. Consequently, the light beam 4 perpendicularly enters and is reflected at the position of the measured diameter of the surface 17. The reflected light beam 4 again passes along the original optical path and is combined with the light beam 5 by the polarizing beam splitter 7, and the fluctuation of the difference in the length of optical path resulting from the rotation of the rotary stage 14 is measured.

The difference in the length of optical path between the light beam 4 and the light beam 5 obtained in the measurement of the second and subsequent surfaces is affected by the upper surface. Accordingly, the surface shape measurement data of the measured surface 16 is used for the surface 17, and correction is effected by the arithmetic and measuring means 34, and the calculation of true shape data is effected.

The deflecting mirror 12 is then adjusted and the position of incidence of the light beam 4 onto the surface 17 is sequentially changed to thereby change the measured diameter and effect the measurement of the data of the difference in the length of optical path, and obtain the data of the difference in the length of optical path of the entire circumference of the lens for each measured diameter. The influence of the upper surface shape is removed from the data obtained in each measured diameter by the arithmetic and measuring means 34 and the calculation of the shape data is effected.

Likewise, when a surface 18 at the more inner part is to be measured, the surface shape components of the surfaces 16 and 17 preceding the surface 18 are corrected from the data of the difference between the lengths of two optical path, and when a surface 19 is to be measured, the surface shape components of the surfaces 16, 17 and 18 are corrected from the data of the difference between the lengths of two optical paths, whereby it is possible to sequentially optically measure the shape of the surfaces at the inner part. Consequently, to measure the true shape of the surface at the inner part, it is necessary that the surface shape of the surface preceding that surface be already measured.

In the present embodiment, the measuring state has been changed by the rotation and movement of the deflecting mirror 12, but if a mechanism capable of adjusting the spacing between an interference diameter main body 100 and the optical system to be measured is added, it will be possible to realize a wider measuring area.

Also, the present embodiment is of a construction in which the light beam 4 is condensed at the center of curvature or the apparent center of curvature by the zoom lens 10. But, if measurement is effected with the zoom lens 10 adjusted so as to assume the so-called cat's eye state in which the light beam 4 is condensed on the surface to be measured, the diameter of the light beam on the surface to be measured will become small, and the error of the position of the measured diameter can be reduced and measurement of higher accuracy can be effected.

Figure 3:
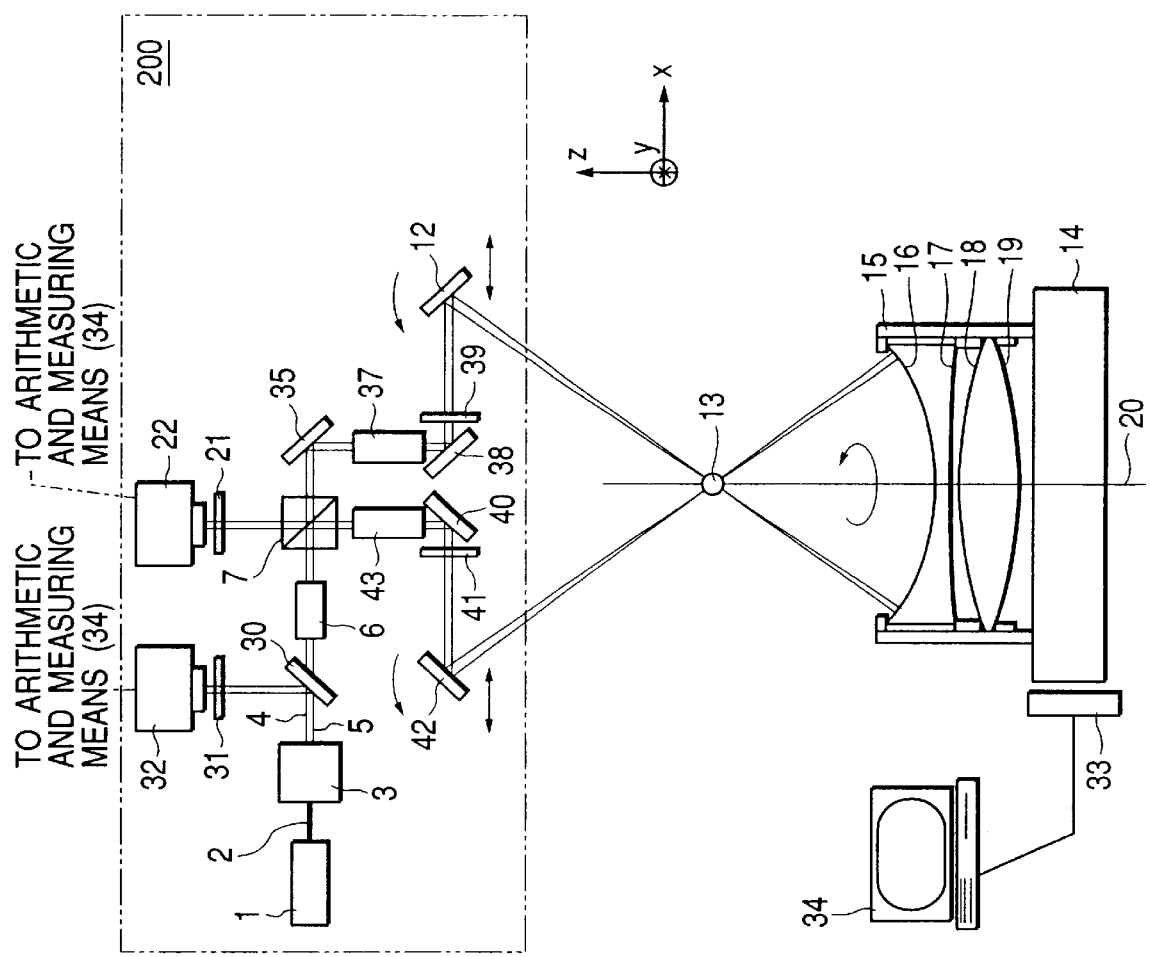
FIG. 3 shows Embodiment 1 of the surface shape measuring state of the present invention.

FIG. 3 shows the construction of an optical system according to Embodiment 2 of the present invention, and the xyz axes are plotted in the same manner as in Embodiment 1. The present embodiment is such that the light beam 5 reflected by the mirror 9 in Embodiment 1 is also made to enter the optical system 15 to be measured to thereby achieve an improvement in measuring accuracy.

A laser beam 2 emitted from a laser source 1 is divided into two-frequency lights 4 and 5 which are two coherent light beams of which the polarization azimuths are orthogonal to each other by a frequency shifter 3. In FIG. 3, the polarization direction of the light beam 4 is parallel to the z-axis, and the polarization direction of the light beam 5 is parallel to the y-axis. Part of the two-frequency lights is taken out as a reference signal by a beam splitter 30 and interferes on a polarizing plate 31, and is detected by a first light receiving element 32 and is sent to arithmetic and measuring means 34.

On the other hand, the light transmitted through the beam splitter 30 becomes a plane wave of a large diameter by a beam expander 6, and the light beam 4 is transmitted through a polarizing beam splitter 7 and the light beam 5 is reflected by the polarizing beam splitter 7.

The light beam 4 transmitted through the polarizing beam splitter 7 is deflected by a mirror 35, and has its wavefront adjusted so as to enter a first zoom lens 37 and be condensed at the central position 13 of the curvature of a surface 16 to be measured. The light beam 4 is then deflected in the x-direction by a mirror 38, enters a quarter wavelength plate 39 and is converted into a circularly polarized light, and travels toward a deflecting mirror 12. The deflecting mirror 12 deflects the light beam 4 so as to pass through the center 13 of the curvature of the surface 16 to be measured of the optical system 15 to be measured, and perpendicularly enter the predetermined diameter of the surface 16 to be measured.

The arithmetic and measuring means 34 moves the angle and position of the deflecting mirror 12 on the basis of the design data of the optical system 15 to be measured so that the light beam 4 may pass through the center 13 of the curvature of the surface 16 to be measured and perpendicularly enter the position of the predetermined diameter of the surface 16 to be measured. Accordingly, the deflecting mirror 12 is adapted to be rotatable about the y-axis and movable in the direction of the x-axis.

The light beam 4 has its wavefront adjusted so as to be condensed at the center 13 of the curvature of the surface 16 to be measured by a zoom lens 37 and therefore, enters and is reflected by the surface 16 to be measured with a wavefront coincident with the curvature of the surface 16 to be measured, and returns along the same path and is transmitted through the quarter wavelength plate 39.

The light beam 4 is again transmitted through the quarter wavelength plate 39, and becomes a linearly polarized light parallel to the y-axis and having its polarization azimuth rotated by 90° with respect to its original polarization azimuth, and is deflected in the z-direction by the mirror 38, whereafter it is again transmitted through the zoom lens 37 and becomes a plane wave. The light beam 4 subsequently deflected by the mirror 35 has its polarization azimuth rotated by 90° and made parallel to the y-axis and therefore, is reflected by the polarizing beam splitter 7 and is again coupled to the light beam 5 and travels toward a polarizing plate 21.

On the other hand, the light beam 5 reflected by the polarizing beam splitter 7 has its wavefront adjusted so as to enter a second zoom lens 43 and be condensed at the central position 13 of the curvature of the surface 16 to be measured, whereafter it is deflected in the x-direction by a mirror 40 and enters a quarter wavelength plate 41. The light beam 5 is converted into a circularly polarized light by the quarter wavelength plate 41, and travels toward a deflecting mirror 42. The deflecting mirror 42 deflects the light beam 5 so as to pass through the center 13 of the curvature of the surface 16 of the optical system 15, and perpendicularly enter a location of a relative azimuth 180° about an optical axis 20 with the same diameter as the position of incidence of the light beam 4 onto the surface 16.

At this time, the arithmetic and measuring means 34 moves the angle and position of the deflecting mirror 42 on the basis of the design data of the optical system 15 to be measured so that the light beam 5 may pass through the center 13 of the curvature of the surface 16 and perpendicularly enter the position of the predetermined diameter of the surface 16. Accordingly, the deflecting mirror 42 is adapted to be rotatable about the y-axis and movable along the x-axis.

As previously described, the light beam 5 has its wavefront adjusted so as to be condensed at the center 13 of the curvature of the surface 16 by the zoom lens 43 and therefore, enters and is reflected by the surface 16 with a wavefront coincident with the curvature of the surface 16, and returns along the same path and is again transmitted through the quarter wavelength plate 41.

The light beam 5 is again transmitted through the quarter wavelength plate 41 and becomes a linearly polarized light having its polarization azimuth rotated by 90° with respect to its original polarization azimuth, and is deflected in the z-direction by the mirror 40, whereafter it is again transmitted through the zoom lens 43 and becomes a plane wave. The light beam 5 has become parallel to the y-axis with its polarization azimuth rotated by 90° and therefore, is transmitted through the polarizing beam splitter 7 and is re-coupled to the light beam 4, and travels toward a polarizing plate 21.

The two-frequency lights 4 and 5 passed through the polarizing plate 21 and having their polarization directions made even, interfere with each other and are detected by a second light receiving element 22. The detection signal has the information of the surface 16 and therefore is sent as a measurement signal to the arithmetic and measuring means 34.

The reference signal and the measurement signal become a sine wave of a frequency equal to the difference in frequency between the two-frequency lights by the principle of optical heterodyne measurement. The phase difference between these two signals is proportional to the difference in the length of optical path between the two light beams 4 and 5 and therefore if the phases are measured by the use of a phase meter or the like, the difference in the length of optical path can be simply measured.

After the optical system is set to the above-described state, the optical system 15 is rotated about the optical axis thereof by a rotary stage 14 of high accuracy. The optical system 15 is adjusted in advance so that the optical axis of the optical system 15 and the rotation axis of the rotary stage 14 may coincide with each other. The rotation azimuth of the rotary stage 14 is detected by rotation azimuth detecting means 33 and is sent to the arithmetic and measuring means 34. If the surface 16 is of a rotation-symmetrical shape with respect to the rotation axis, the difference in the length of optical path between the two light beams 4 and 5 does not change, but if the surface 16 has a rotation-asymmetrical surface shape component, the difference in the length of optical path between the two light beams changes with the rotation of the optical system 15. The arithmetic and measuring means 34 obtains the fluctuation of the difference in the length of optical path between the two light beams 4 and 5 resulting from the rotation azimuth of the rotary stage 14, and effects the calculation of the shape data of the surface 16 in the measured diameter.

The data of the difference in the length of optical path between the two light beams in the present embodiment has only its odd order components such as $1\theta$ component and $3\theta$ component by coma and eccentricity extracted because the light beams enter the optical system 15 to be measured at a relative azimuth of 180° about the optical axis 20.

Further, it is the feature of the present embodiment that in the detection of the amplitude of a change in the difference in the length of optical path between the two light beams resulting from rotation, when the amplitude of the odd order component of the surface shape is A, the amplitude is detected as 4A in the present embodiment. The amplitude detected in the construction of Embodiment 1 is 2A and therefore, in the present embodiment, it is possible to measure the odd order component of the surface shape with double resolving power.

After the measurement in a measuring diameter is terminated, the deflecting mirrors 12 and 42 are rotatively moved and adjusted, and the positions of incidence of the light beams 4 and 5 onto the surface 16 to be measured are changed to thereby change the measuring diameter, and the measurement of the data of the difference in the length of optical path is effected. This operation is sequentially performed to change the measuring diameter, and the data of the difference in the length of optical path of the full circumference of the lens is obtained and the calculation of the shape data of each measuring diameter is effected by the arithmetic and measuring means 34. If the shape data for the plurality of diameters of the surface 16 to be measured obtained in this manner are connected together, the shape data of the whole of the surface 16 to be measured can be obtained.

In the present embodiment, the relative azimuth of the two light beams 4 and 5 is 180° to the optical axis of the optical system 15 to be measured, but if a construction in which the relative azimuth is 90° is adopted, the measurement of the 2θ component of astigmatism, in addition to the 1θ component and 3θ component of coma or the like, is also possible. At this time, the amplitude of the change in the difference in the length of optical path between the two light beams with respect to the astigmatism component resulting from rotation becomes 4A when the amplitude of the astigmatism component of the surface shape is A. Since the amplitude detected in the construction of Embodiment 1 is 2A, it is possible in the present embodiment to measure the astigmatism component of the surface shape with double resolving power.

Further, if a construction is adopted in which the mirror 38, the quarter wavelength plate 39 and the deflecting mirror 12 are made integral with one another and rotatable about the z-axis and the relative azimuth of the two light beams 4 and 5 is variable, it will be possible to change the relative azimuth of the two light beams in conformity with an asymmetrical component to be measured, such as a relative azimuth of 180° during the measurement of 1θ component, and a relative azimuth of 90° during the measurement of an astigmatism component, thereby improving the measuring resolving power.

The second surface 17 from the top of the optical system 15 to be measured can also be measured as in Embodiment 1. The zoom lenses 37 and 43 are adjusted, and the deflecting mirrors 12 and 42 are rotated and moved and thereby adjusted so that the two light beams 4 and 5 may pass through the measuring diameter of the surface 17 to be measured and be condensed at the apparent central position of the curvature thereof, not shown, and perpendicularly enter and be reflected at the position of the measuring diameter of the surface 17 to be measured. The reflected light beams 4 and 5 again pass along the original paths and are combined together by the polarizing beam splitter 7, and the fluctuation of the difference in the length of optical path resulting from the rotation of the rotary stage 14 is measured.

The differences in the length of optical path between the light beam 4 and the light beam 5 obtained in the measurement of the first and subsequent surfaces are affected by the upper surfaces. Accordingly, in the case of the surface 17, the surface shape measurement data of the measured surface 16 is used and correction is effected by the arithmetic and measuring means 34 to thereby effect the calculation of the true shape data.

The deflecting mirrors 12 and 42 are then adjusted to sequentially change the positions of incidence of the two light beams onto the surface 17 and change the measuring diameter. Also, the data of the difference in the length of optical path is measured to thereby obtain the data of the difference in the length of optical path of the full circumference of the lens in each measuring diameter. When the influence of the surface shape of the upper surface is removed from the data obtained in each measuring diameter by the arithmetic and measuring means 34 and a calculation for connecting the respective diameters together is effected, the shape data of the whole of the surface 17 can be calculated.

Likewise, when a surface 18 at a more inner part is to be measured, the surface shape components of the surfaces 16 and 17 are corrected from the data of the difference in the length of optical path between the two light beams, and when a surface 19 is to be measured, the surface shape components of the surfaces 16, 17 and 18 are corrected from the data of the difference in the length of optical path between the two light beams. In the measurement of the surface at the inner part, it is possible to sequentially correct the influence of the surface preceding that surface at the inner part by a calculation to thereby measure the true shape directly in a state in which the optical system to be measured has been assembled.

While in the present embodiment, the measuring state is changed by the rotation and movement of the deflecting mirrors 12 and 42, it will be possible to realize a wider measuring area if a mechanism capable of adjusting the spacing between an interference diameter main body 200 and the optical system to be measured is added.

Also, the present embodiment adopts a construction in which the zoom lenses 37 and 43 condense the two light beams 4 and 5 at the center of the curvature or the apparent center of the curvature, but if the zoom lenses 37 and 43 are adjusted so as to bring about the so-called cat's eye state in which the light beams 4 and 5 are condensed on the surface to be measured, and measurement is effected, the diameters of the light beams on the surface to be measured will become small and the error of the position of the measuring diameter can be reduced and measurement of higher accuracy can be accomplished.

As described above, in the surface shape measurement of measuring the state of any surface of the optical system to be measured, a coherent light beam is applied to the plurality of diameters of the surface to be measured of the optical system to be measured being rotated about its own optical axis to thereby measure the surface shape in each diameter. The surface shapes obtained from the plurality of measuring diameters are connected together to thereby obtain the shape of the whole surface, and with regard to the surface shape of the surface at the inner part of the optical system to be measured, the correction of the influence of the state of a surface preceding that surface at the inner part is effected, whereby it has become possible to measure the surface shape of any surface of the optical system to be measured in its assembled state, i.e., in a state in which it has been put into ironware. Particularly, there has not heretofore existed means for effecting the measurement of the surface shape optically at the inner part, to detect a problem. Thus, the present invention can be said to contribute very greatly to an improvement in the performance of the optical system.

First, a plurality of lenses are put into ironware to assemble an optical system. Next, the surface shape of each lens surface in the optical system is measured by the use of any one of the above-described surface shape measuring apparatuses.

From the result of the obtained measurement of the surface shape, the performance of this optical system such as the aberration thereof is judged, and on the basis of this judgment, a modifying step such as the correction of aberration is done by the fine adjustment of the entire construction. A known technique can be used as the way of fine adjustment.

Thus, there is finally manufactured a good optical system of which the optical performance has been adjusted, and this method is suitable for the manufacture of an optical system for a projection exposing apparatus used in the manufacture of devices such as semiconductors.

While in the above-described example, the optical system is a lens system, the present invention can be well applied even to a system including a reflecting system in at least a portion thereof.

What is claimed is:

1. An apparatus for measuring the surface shape of a surface to be measured of an optical system comprising:
   a stage holding the optical system thereon;
   an irradiating optical system for sequentially applying a coherent light beam to a plurality of measuring diameter positions of the surface to be measured of the optical system while the optical system and the coherent light beam are relatively rotated;
   means for detecting the relative rotation azimuth of the optical system and the coherent light beam;
   a light receiving element for detecting light of the coherent light beam reflected from the surface to be measured; and
   a calculating system for effecting measurement of the surface shape of the surface to be measured on the basis of the result of the detection of the coherent light beam at each of the plurality of measuring diameter positions of the surface to be measured and the result of the detection by said means for detecting the relative rotation azimuth,
   wherein said irradiating optical system condenses the coherent light beam at one of (i) the center of the curvature of the surface to be measured, and (ii) the apparent center of the curvature of the surface to be measured.

2. The apparatus of claim 1, wherein when the surface to be measured is an internal surface of the optical system held on said stage, said calculating system effects the measurement of the surface shape of the surface to be measured by adding thereto the influence of the shape of a surface through which the light beam passes before it enters the surface to be measured.

3. The apparatus of claim 1, wherein said irradiating optical system has a deflecting mirror for controlling the angle and position of the light beam to enable the coherent light beam to enter the plurality of measuring diameter positions of the surface to be measured in a predetermined state.

4. The apparatus of claim 1, wherein said irradiating optical system causes two coherent light beams to enter different positions of the surface to be measured at the same angle of incidence on the same diameter of one of the plurality of measuring diameter positions, and said light receiving element receives the reflected lights of the two light beams from the surface to be measured.

5. The apparatus of claim 4, wherein the relative azimuth angle of the two coherent light beams to the rotation axis of the relatively rotating optical system and coherent light beam is 180°.

6. The apparatus of claim 4, wherein the relative azimuth angle of the two coherent light beams to the rotation axis of the relatively rotating optical system and coherent light beam is 90°.

7. The apparatus of claim 4, wherein the relative azimuth angle of the two coherent light beams to the rotation axis of the relatively rotating optical system and coherent light beam is variable.

8. The apparatus of claim 7, wherein said calculating system effects the measurement of the surface shape of the surface to be measured from the result of the detection obtained by said light receiving element and the relative azimuth angle change of the two coherent light beams to the rotation axis of the relatively rotating optical system and coherent light beam.

9. A method of measuring the surface shape of a surface to be measured of an optical system comprising:
   holding the optical system on a stage;
   sequentially applying a coherent light beam to a plurality of measuring diameter positions of the surface to be measured of the optical system while the optical system and the coherent light beam are relatively rotated;
   detecting the reflected light of the coherent light beam from the surface to be measured;
   detecting the relative rotation azimuth of the optical system and the coherent light beam; and
   measuring the surface shape of the surface to be measured on the basis of the result of the detection of the coherent light at each of the plurality of measuring diameter positions of the surface to be measured and the result of the detection of the relative rotation azimuth,
   wherein the coherent light beam is condensed at one of (i) the center of the curvature of the surface to be measured, and (ii) the apparent center of the curvature of the surface to be measured.

10. The method of claim 9, wherein when the surface to be measured is an internal surface of the optical system, said measurement of the surface shape of the surface to be measured is effected by adding thereto the influence of the shape of a surface through which the light beam passes before it enters the surface to be measured.

11. The method of claim 9, wherein when the surface to be measured is an internal surface of the optical system, the shape of a surface through which the light beam passes before entering the surface to be measured is measured earlier.

12. The method of claim 9, wherein two coherent light beams enter different positions of the surface to be measured at the same angle of incidence on the same diameter of one of the plurality of measuring diameter positions of the surface to be measured, and the reflected lights of the two light beams from the surface to be measured is detected.

13. The method of claim 12, wherein the relative azimuth angle of the two coherent light beams to the rotation axis of the relatively rotating optical system and coherent light beam is 180°.

14. The method of claim 12, wherein the relative azimuth angle of the two coherent light beams to the rotation axis of the relatively rotating optical system and coherent light beam is 90°.

15. The method of claim 12, wherein the relative azimuth angle of the two coherent light beams to the rotation axis of the relatively rotating optical system and coherent light beam is variable.

16. The method of claim 15, wherein said measurement of the surface shape of the surface to be measured is effected from the result of said detection of the relative azimuth angle change of the two coherent light beams to the rotation axis of the relatively rotating optical system and coherent light beam.

17. A method of manufacturing an optical system comprising:

assembling the optical system;

holding the optical system on a stage;

sequentially applying a coherent light beam to a plurality of measuring diameter positions of a surface to be measured of the optical system while the optical system and the coherent light beam are relatively rotated;

detecting the reflected light of the coherent light beam from the surface to be measured;

detecting a relative rotation azimuth of the coherent light beam and the optical system;

measuring the surface shape of the surface to be measured on the basis of the result of the detection of the reflected light of the coherent light beam at each of the plurality of measuring diameter positions of the surface to be measured and the result of the detection of the relative rotation azimuth; and modifying the optical system on the basis of the result of said measurement of the surface shape, wherein the coherent light beam is condensed at one of (i) the center of the curvature of the surface to be measured, and (ii) the apparent center of the curvature of the surface to be measured.

18. The method of claim 17, wherein each surface in the optical system is sequentially measured as the surface to be measured, and said step of modifying the optical system is effected on the basis of the result of each measurement.

19. The method of claim 18, wherein when the surface to be measured is an internal surface of the optical system, said measurement of the surface shape of the surface to be measured is effected by adding thereto the influence of the shape of a surface through which the light beam passes before it enters the surface to be measured.

20. The apparatus of claim 1, wherein said irradiating optical system has a zoom lens for condensing the coherent light beam at the center of curvature or the apparent center of curvature of the surface to be measured.

21. An apparatus comprising:

a stage holding a target optical system thereon;

an irradiating optical system, wherein said irradiating optical system condenses a coherent light beam at the center of curvature or the apparent center of curvature of a desired surface of the target optical system and applies the coherent light beam to the desired surface while the target optical system and the coherent light beam are relatively rotated; and a light receiving element for detecting light of the coherent light beam reflected from the desired surface of the target optical system;

wherein the desired surface is an internal surface of the target optical system.

22. An apparatus comprising:

a stage holding a target optical system thereon;

an irradiating optical system for applying a coherent light beam to a desired surface of the target optical system, wherein said irradiating optical system comprises a deflecting mirror for controlling the angle and position of the light beam to enable the coherent light beam to enter the desired surface while the target optical system and the coherent light beam are relatively rotated; and a light receiving element for detecting the coherent light beam reflected from the desired surface of the target optical system.

23. The apparatus of claim 22, wherein the desired surface of the target optical system is an internal surface of the target optical system.

24. An apparatus comprising:

a stage holding a target optical system thereon;

an irradiating optical system for applying two coherent light beams to enter different positions of a desired surface of the target optical system at the same angle of incidence on the same diameter of the measuring diameter positions, wherein the target optical system and the coherent light beam are relatively rotated; and a light receiving element for detecting light of the coherent light beam reflected from the desired surface of the target optical system;

wherein the relative azimuth angle of the two coherent light beams to the rotation axis of the relatively rotating target optical system and coherent light beam is variable.

25. The apparatus of claim 24, wherein the desired surface of the target optical system is an internal surface of the target optical system.

26. The apparatus of claim 24, wherein the relative azimuth angle of the two coherent light beams to the rotation axis of the relatively rotating optical system and coherent light beam is 180°.

27. The apparatus of claim 24, wherein the relative azimuth angle of the two coherent light beams to the rotation axis of the relatively rotating optical system and coherent light beam is 90°.

28. A method of manufacturing an optical system comprising the steps of:

assembling the optical system;

holding the optical system on a stage;

applying a coherent light beam to a desired surface of the optical system held on the stage while the optical system and the coherent light beam are relatively rotated;

detecting the reflected light of the coherent light beam from the desired surface; and measuring the characteristic of the optical system on the basis of the result of the detection of the coherent light, wherein the coherent light beam is condensed at one of (i) the center of the curvature of the surface to be measured, and (ii) the apparent center of the curvature of the surface to be measured and the desired surface is an internal surface of the target optical system.

29. A method of manufacturing an optical system comprising the steps of:

assembling the optical system;

holding the optical system on a stage;

applying a coherent light beam to a desired surface of the optical system held on the stage while the optical system and the coherent light beam are relatively rotated;

detecting the reflected light of the coherent light beam from the desired surface; and measuring the characteristic of the optical system on the basis of the result of the detection of the coherent light;

wherein the angle and position of the coherent light beam entering the desired surface of the optical system is controlled by a deflecting mirror.

30. The method of claim 29, wherein the desired surface of the optical system is an internal surface of the optical system.

31. A method of manufacturing an optical system comprising the steps of:

assembling the optical system;

holding the optical system on a stage;

applying two coherent light beams to enter different positions of a desired surface of the optical system held on the stage at the same angle of incidence on the same diameter of the measuring diameter positions while the optical system and the coherent light beam are relatively rotated;

detecting the reflected light of the coherent light beam from the desired surface; and measuring the characteristic of the optical system on the basis of the result of the detection of the coherent light, wherein the relative azimuth angle of the two coherent light beams to the rotation axis of the relatively rotating optical system and coherent light beam is variable.

32. The method of claim 31, wherein the desired surface of the optical system is an internal surface of the optical system.

* * * * *

UNITED STATES PATENT AND TRADEMARK OFFICE
CERTIFICATE OF CORRECTION

PATENT NO. : 6,721,056 B1
DATED : April 13, 2004
INVENTOR(S) : Akihiro Nakauchi et al.

It is certified that error appears in the above-identified patent and that said Letters Patent is hereby corrected as shown below:

Column 4,
Line 31, "path," should read -- paths, --.

Column 5,
Line 21, "to be measured" should be deleted.

Signed and Sealed this

Twenty-eighth Day of December, 2004

JON W. DUDAS
*Director of the United States Patent and Trademark Office*